United States Patent
Kim et al.

(10) Patent No.: US 10,012,293 B2
(45) Date of Patent: Jul. 3, 2018

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Jin Ho Kim, Suwon-si (KR); Jinseok Kim, Seoul (KR); Jae Chang Kook, Hwaseong-si (KR); Dong Hwan Hwang, Seoul (KR); Seong Wook Hwang, Gunpo-si (KR); Woo Jin Chang, Suwon-si (KR); Tae Whan Kim, Yongin-si (KR); Seongwook Ji, Gunpo-si (KR); Chon Ok Kim, Yongin-si (KR); Wonmin Cho, Hwaseong-si (KR); Hyun Sik Kwon, Seoul (KR); Jong Sool Park, Hwaseong-si (KR); Kyeong Hun Lee, Seoul (KR); Jong Soo Kim, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/374,858

(22) Filed: Dec. 9, 2016

(65) Prior Publication Data
US 2018/0094700 A1 Apr. 5, 2018

(30) Foreign Application Priority Data
Oct. 4, 2016 (KR) .................. 10-2016-0127463

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2048* (2013.01)

(58) Field of Classification Search
CPC ............... F16H 3/66; F16H 2200/2012; F16H 2200/0069; F16H 2200/2048
See application file for complete search history.

(56) References Cited

U.S. PATENT DOCUMENTS 8,992,371 B1 * 3/2015 Shim ...................... F16H 3/66
475/271

FOREIGN PATENT DOCUMENTS

KR 10-2013-0031457 A 3/2013

* cited by examiner

*Primary Examiner* — Erin D Bishop
(74) *Attorney, Agent, or Firm* — Knobbe Martens Olson & Bear LLP

(57) ABSTRACT

A planetary gear train of an automatic transmission for a vehicle is disclosed. The planetary gear train provides ten forward speed stages and one reverse speed stage by combining four planetary gear sets with seven control elements. The planetary gear train includes an input shaft, an output shaft, four planetary gear sets, eight shafts interconnecting rotation elements of the four planetary gear sets, four clutches, and three brakes for controlling operation of the planetary gear train. The planetary gear train is configured to have a gear ratio span greater than 10.0 while securing linearity of step ratios of shift stages.

7 Claims, 3 Drawing Sheets

FIG. 2

| Speed Stage | Speed Stage | | | | | | | Gear Ratio | Step ratio | Note |
|---|---|---|---|---|---|---|---|---|---|---|
| | C1 | C2 | C3 | C4 | B1 | B2 | B3 | | | |
| D1 | | ● | | ● | ● | | | 4.804 | - | |
| D2 | | ● | ● | | ● | | | 3.13 | 1.535 | |
| D3 | ● | ● | | | ● | ● | | 2.12 | 1.476 | |
| D4 | ● | ● | | | ● | | | 1.535 | 1.381 | |
| D5 | ● | ● | | | | ● | | 1.19 | 1.290 | |
| D6 | ● | ● | ● | | | | | 1 | 1.190 | Gear ratio span :10.0 |
| D7 | ● | | ● | | | ● | | 0.811 | 1.233 | Ratio of REV/D1 :1.05 |
| D8 | ● | | | ● | | ● | | 0.677 | 1.198 | |
| D9 | | ● | ● | ● | | ● | | 0.585 | 1.157 | |
| D10 | | | | ● | | ● | | 0.48 | 1.219 | |
| REV | | | ● | | ● | | ● | -5.039 | - | |

# PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0127463 filed in the Korean Intellectual Property Office on Oct. 4, 2016, the entire contents of which are incorporated herein by reference.

BACKGROUND (a) Field

The present disclosure relates to an automatic transmission for a vehicle. More particularly, the present disclosure relates to a planetary gear train of an automatic transmission for a vehicle that improves power delivery performance and fuel efficiency by achieving at least ten forward speed stages and widening speed ratio with a minimum number of constituent elements being used, and secures linearity of step ratios.

(b) Description of the Related Art

In the field of an automatic transmission, more multiplicity of shift-stages is useful technology for enhancement of fuel consumption and drivability of a vehicle. Recently increase of oil price is triggering a hard competition in enhancing fuel consumption of a vehicle.

In this sense, research on an engine has been undertaken to achieve weight reduction and to enhance fuel consumption by so-called downsizing and research on an automatic transmission has been performed to simultaneously provide better drivability and fuel consumption by achieving more shift stages.

In order to achieve more shift stages for an automatic transmission, the number of parts, especially the number of planetary gear sets, is typically increased, which may deteriorate installability, production cost, weight and/or power flow efficiency.

Therefore, development of a planetary gear train capable of achieving maximum efficiency by minimum number of parts is substantially beneficial for maximizing improvement of fuel consumption by multiple shift-stages of an automatic transmission.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to seven control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, since an 8-speed automatic transmission generally has gear ratio span of 6.5-7.5 (gear ratio span is an important factor for securing linearity of step ratios), improvement of power performance and fuel economy may not be great. In addition, if 8-speed automatic transmission has gear ratio span larger than 9.0, it is hard to secure linearity of step ratios. Therefore, driving efficiency of an engine and drivability of a vehicle may be deteriorated, and thus, development of high efficiency automatic transmissions which achieve at least nine forward speed stages is desirable.

The above information disclosed in this Background section is only for enhancement of understanding of the background of the invention and therefore it may contain information that does not form the prior art that is already known in this country to a person of ordinary skill in the art.

The disclosure of this section is to provide background of the invention. Applicant notes that this section may contain information available before this application. However, by providing this section, Applicant does not admit that any information contained in this section constitutes prior art.

SUMMARY

A planetary gear train of an automatic transmission for a vehicle according to an exemplary embodiment of the present disclosure may include: an input shaft receiving torque of an engine; an output shaft outputting changed torque; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft connecting the second rotation element and the fourth rotation element and connected with the input shaft; a second shaft connecting the third rotation element and the tenth rotation element; a third shaft connecting the fifth rotation element and the ninth rotation element; a fourth shaft connected with the sixth rotation element; a fifth shaft connecting the seventh rotation element and the twelfth rotation element; a sixth shaft connected with the eighth rotation element; a seventh shaft connected with the eleventh rotation element and connected with the output shaft; and an eighth shaft connected with the first rotation element.

The fifth, sixth, and eighth shafts may be selectively connected with a transmission housing respectively, the first shaft may be selectively connected with the fourth shaft, the second shaft may be selectively connected with the fourth shaft and the sixth shaft respectively, and the sixth shaft may be selectively connected with the seventh shaft.

The planetary gear train may further include: a first clutch selectively connecting the sixth shaft and the seventh shaft; a second clutch selectively connecting the first shaft and the fourth shaft; a third clutch selectively connecting the second shaft and the fourth shaft; a fourth clutch selectively connecting the second shaft and the sixth shaft; a first brake selectively connecting the fifth shaft and the transmission housing; a second brake selectively connecting the eighth shaft and the transmission housing; and a third brake selectively connecting the sixth shaft and the transmission housing.

The fifth, sixth, and eighth shafts may be selectively connected with a transmission housing respectively, the first shaft may be selectively connected with the third shaft, the second shaft may be selectively connected with the fourth shaft and the sixth shaft respectively, and the sixth shaft may be selectively connected with the seventh shaft.

The planetary gear train may further include: a first clutch selectively connecting the sixth shaft and the seventh shaft; a second clutch selectively connecting the first shaft and the third shaft; a third clutch selectively connecting the second shaft and the fourth shaft; a fourth clutch selectively connecting the second shaft and the sixth shaft; a first brake selectively connecting the fifth shaft and the transmission housing; a second brake selectively connecting the eighth shaft and the transmission housing; and a third brake selectively connecting the sixth shaft and the transmission housing.

The first, second, and third rotation elements of the first planetary gear set may be respectively a first sun gear, a first planet carrier, and a first ring gear of the first planetary gear set, the fourth, fifth, and sixth rotation elements of the second planetary gear set may be respectively a second sun gear, a second planet carrier, and a second ring gear of the second planetary gear set, the seventh, eighth, and ninth rotation elements of the third planetary gear set may be respectively a third sun gear, a third planet carrier, and a third ring gear of the third planetary gear set, and the tenth, eleventh, and twelfth rotation elements of the fourth planetary gear set may be respectively a fourth sun gear, a fourth planet carrier, and a fourth ring gear of the fourth planetary gear set.

The first, second, third, and fourth planetary gear sets may be disposed in a sequence of the first, second, third, and fourth planetary gear sets from an engine side.

Further, effects that can be obtained or expected from exemplary embodiments of the present disclosure are directly or suggestively described in the following detailed description. That is, various effects expected from exemplary embodiments of the present disclosure will be described in the following detailed description.

BRIEF DESCRIPTION OF THE DRAWINGS

FIG. 2 is an operational chart for respective friction elements at respective shift-stages in a planetary gear train according to a first exemplary embodiment of the present disclosure.

DESCRIPTION OF SYMBOLS

Figure 1:
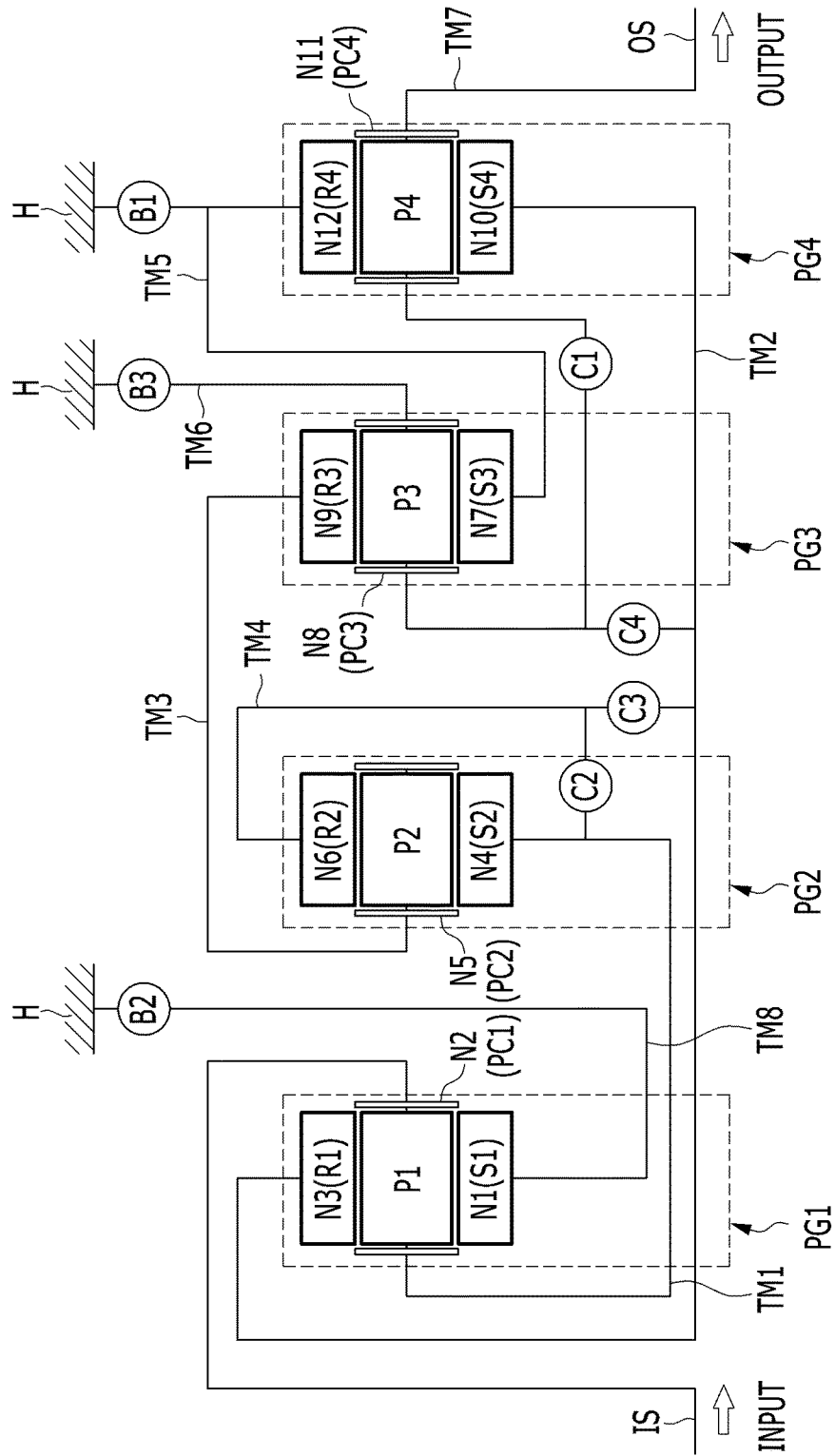
FIG. 1 is a schematic diagram of a planetary gear train according to a first exemplary embodiment of the present disclosure.

B1,B2,B3: first, second, and third brakes
C1,C2,C3,C4: first, second, third, and fourth clutches
PG1,PG2,PG3,PG4: first, second, third, and fourth planetary gear sets
S1,S2,S3,S4: first, second, third, and fourth sun gears
PC1,PC2,PC3,PC4: first, second, third, and fourth planet carriers
R1,R2,R3,R4: first, second, third, and fourth ring gears
IS: input shaft
OS: output shaft
TM1,TM2,TM3,TM4,TM5,TM6,TM7,TM8: first, second, third, fourth, fifth, sixth, seventh, and eighth shafts

DETAILED DESCRIPTION OF THE EMBODIMENTS

Hereinafter, an exemplary embodiment of the present disclosure will be described in detail with reference to drawings.

However, parts which are not related with the description are omitted for clearly describing the exemplary embodiments of the present disclosure and like reference numerals refer to like or similar elements throughout the specification.

In the following description, dividing names of components into first, second, and the like is to divide the names because the names of the components are the same as each other and an order thereof is not particularly limited.

The planetary gear train according to the exemplary embodiment of the present disclosure may achieve ten forward speed stages and one reverse speed stage by combining four planetary gear sets being simple planetary gear sets with seven control elements.

In addition, a planetary gear train according to an exemplary embodiment of the present disclosure may realize a gear ratio span of more than 10.0, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

FIG. 1 is a schematic diagram of a planetary gear train according to a first exemplary embodiment of the present disclosure.

Referring to FIG. 1, a planetary gear train according to a first exemplary embodiment of the present disclosure includes first, second, third, and four planetary gear sets PG1, PG2, PG3, and PG4 arranged on a same axis, an input shaft IS, an output shaft OS, eight shafts TM1 to TM8 interconnecting rotation elements of the first, second, third, and four planetary gear sets PG1, PG2, PG3, and PG4, four clutches C1 to C4 and three brakes B1 to B3 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The first rotation element N1 is directly connected with the fourth rotation element N4, the third rotation element N3 is directly connected with the tenth rotation element N10, the fifth rotation element N5 is directly connected with the ninth rotation element N9, and the seventh rotation element N7 is directly connected with the twelfth rotation element N12 such that the first, the second, the third, and the fourth planetary gear sets PG1, PG2, PG3, and PG4 include eight shafts TM1 to TM8.

The eight shafts TM1 to TM8 will be described in further detail.

The eight shafts TM1 to TM8 may be rotation members that directly connect a plurality of rotation elements among the rotation elements of the planetary gear sets PG1, PG2, PG3, and PG4 with each other or that are directly connected to any one rotation element of the planetary gear sets PG1, PG2, PG3, and PG4 and rotate with the any one rotation element to transmit torque, or may be fixed members that selectively or directly connect any one rotation element of the planetary gear sets PG1, PG2, PG3, and PG4 to the transmission housing H to fix the any one rotation element.

The first shaft TM1 connects the second rotation element N2 (first planet carrier PC1) and the fourth rotation element N4 (second sun gear S2), and is directly connected with the input shaft IS.

The second shaft TM2 connects the third rotation element N3 (first ring gear R3) and the tenth rotation element N10 (fourth sun gear S4).

The third shaft TM3 connects the fifth rotation element N5 (second planet carrier PC2) and the ninth rotation element N9 (third ring gear R3).

The fourth shaft TM4 is connected with the sixth rotation element N6 (second ring gear R2), and is selectively connected with the first shaft TM1 and the second shaft TM2.

The fifth shaft TM5 connects the seventh rotation element N7 (third sun gear S3) and the twelfth rotation element N12 (fourth ring gear R4), and is selectively connected with the transmission housing H to be operated as a selective fixed element.

The sixth shaft TM6 is connected with the eighth rotation element N8 (third planet carrier PC3), is selectively connected with the second shaft TM2, and is selectively connected with the transmission housing H to be operated as a selective fixed element.

The seventh shaft TM7 is connected with the eleventh rotation element N11 (fourth planet carrier PC4), is selectively connected with the sixth shaft TM6, and is directly connected with the output shaft OS.

The eighth shaft TM8 is connected with the first rotation element N1 (first sun gear S1), and is selectively connected with the transmission housing H to be operated as a selective fixed element.

In addition, four clutches C1, C2, C3 and C4 are disposed at portions at which any two shafts among the eight shafts TM1 to TM8 including the input shaft IS and the output shaft OS are selectively connected to each other.

In addition, three brakes B1, B2, and B3 are disposed at portions at which any one shaft among the eight shafts TM1 to TM8 is selectively connected to the transmission housing H.

Arrangements of the four clutches C1 to C4 and the three brakes B1 to B3 are described in detail.

The first clutch C1 is disposed between the sixth shaft TM6 and the seventh shaft TM7, and selectively connects the sixth shaft TM6 and the seventh shaft TM7.

The second clutch C2 is disposed between the first shaft TM1 and the fourth shaft TM4, and selectively connects the first shaft TM1 and the fourth shaft TM4.

The third clutch C3 is disposed between the second shaft TM2 and the fourth shaft TM4, and selectively connects the second shaft TM2 and the fourth shaft TM4.

The fourth clutch C4 is disposed between the second shaft TM2 and the sixth shaft TM6, and selectively connects the second shaft TM2 and the sixth shaft TM6.

The first brake B1 is disposed between the fifth shaft TM5 and the transmission housing H, and selectively connects the fifth shaft TM5 to the transmission housing H.

The second brake B2 is disposed between the eighth shaft TM8 and the transmission housing H, and selectively connects the eighth shaft TM8 to the transmission housing H.

the third brake B3 is disposed between the sixth shaft TM6 and the transmission housing H, and selectively connects the sixth shaft TM6 to the transmission housing H.

The control elements including the first, second, third, and fourth clutches C1, C2, C3, and C4 and the first, second, and third brakes B1, B2, and B3 may be multi-plates friction elements of wet type that are operated by hydraulic pressure.

FIG. 2 is an operational chart for respective friction elements at respective shift-stages in a planetary gear train according to a first exemplary embodiment of the present disclosure.

Referring to FIG. 2, three control elements among the first, second, third, and fourth clutches C1, C2, C3 and C4 and the first, second, and third brakes B1, B2, and B3 that are control elements are operated at each speed stage in the planetary gear train according to the first exemplary embodiment of the present disclosure. The first exemplary embodiment of the present disclosure can achieve one reverse speed stage and ten forward speed stages.

The second and fourth clutches C2 and C4 and the first brake B1 are simultaneously operated at a first forward speed stage D1.

In a state that the first shaft TM1 is connected to the fourth shaft TM4 by operation of the second clutch C2 and the second shaft TM2 is connected to the sixth shaft TM6 by operation of the fourth clutch C4, torque of the input shaft IS is input to the first shaft TM1.

In addition, the fifth shaft TM5 is operated as a fixed element by the operation of the first brake B1. Therefore, the torque of the input shaft IS is shifted into the first forward speed stage D1, and the first forward speed stage D1 is output through the output shaft OS connected to the seventh shaft TM7. That is, the operating of the second clutch C2 results in the ninth rotation element N9 of the planetary gear set PG3 being driven by torque from the fifth rotation element N5 (i.e., equal to the torque of the input shaft IS). The seventh rotation element N7 is braked by the brake B1. The operating of clutch C4 connects the eighth rotation element N8 to the tenth rotation element N10. Accordingly, the planetary gear sets PG1, PG3, PG4 operate in compound and torque is outputted from with the eleventh rotation element N11 to the seventh shaft TM7 and the output shaft OS at a ratio of 4.804:1. The second and third clutches C2 and C3 and the first brake B1 are simultaneously operated at a second forward speed stage D2.

In a state that the first shaft TM1 is connected to the fourth shaft TM4 by operation of the second clutch C2 and the second shaft TM2 is connected to the fourth shaft TM4 by operation of the third clutch C3, torque of the input shaft IS is input to the first shaft TM1.

In addition, the fifth shaft TM5 is operated as a fixed element by the operation of the first brake B1. Therefore, the torque of the input shaft IS is shifted into the second forward speed stage D2, and the second forward speed stage D2 is output through the output shaft OS connected to the seventh shaft TM7. That is, the operating of the second and third clutches C2 and C3 results in the torque of the input shaft IS being transferred to the tenth rotation element N10 (fourth sun gear S4) via the second shaft TM2. The twelfth rotation element N12 is braked. The torque is outputted from the second rotation element N2 to the tenth rotation element N10 (fourth sun gear S4) via the second and third clutches C2 and C3 connecting first, second and fourth shafts TM1, TM2, TM4. Accordingly, the planetary gear set PG4 is driven by torque from second rotation element N2 which drives tenth rotation element N10 while the twelfth rotation element N12 is braked by the brake B2. As such, torque is outputted from with the eleventh rotation element N11 to the seventh shaft TM7 and the output shaft OS at a ratio of 3.13:1.

The second clutch C2 and the first and second brakes B1 and B2 are simultaneously operated at a third forward speed stage D3.

In a state that the first shaft TM1 is connected to the fourth shaft TM4 by operation of the second clutch C2, torque of the input shaft IS is input to the first shaft TM1.

In addition, the fifth shaft TM5 and the eighth shaft TM8 are operated as a fixed element by the operation of the first brake B1 and the second brake B2. Therefore, the torque of the input shaft IS is shifted into the third forward speed stage D3, and the third forward speed stage D3 is output through the output shaft OS connected to the seventh shaft TM7. That is, the torque of the input shaft IS is inputted into the second rotation element N2 with the first rotation element N1 braked by the second brake B2. The torque is outputted from the third rotation element N3 (first ring gear R3) to the tenth rotation element N10 (fourth sun gear S4) via the second shaft TM2. Accordingly, the planetary gear set PG4 is driven by torque from the third rotation element N3 which drives tenth rotation element N10 while the twelfth rotation element N12 is braked by the brake B2. As such, torque is outputted from with the eleventh rotation element N11 to the seventh shaft TM7 and the output shaft OS at a ratio of 2.12:1.

The first and second clutches C1 and C2 and the first brake B1 are simultaneously operated at a fourth forward speed stage D4.

In a state that the sixth shaft TM6 is connected to the seventh shaft TM7 by operation of the first clutch C1 and the first shaft TM1 is connected to the fourth shaft TM4 by operation of the second clutch C2, torque of the input shaft IS is input to the first shaft TM1.

In addition, the fifth shaft TM5 is operated as a fixed element by the operation of the first brake B1. Therefore, the torque of the input shaft IS is shifted into the fourth forward speed stage D4, and the fourth forward speed stage D4 is output through the output shaft OS connected to the seventh shaft TM7. That is, the operating of the first and second clutches C1 and C2 results in the torque of the input shaft IS being transferred to the ninth rotation element N9 (third ring gear R3) via third shaft TM3. The seventh rotation element N7 is braked by the brake B1. Accordingly, planetary gear set PG3 is driven by torque from fifth rotation element N5 (i.e., equal to the torque of the input shaft IS) which drives ninth rotation element N9. The seventh rotation element N7 and the twelfth rotation element N12 are connected by fifth shaft TM5. The seventh rotation element is braked by the brake B2. Clutch C1 connects seventh rotation element N7 with the twelfth rotation element N12. Accordingly, the eighth rotation element N8 drives eleventh rotation element N11 which drives the seventh shaft TM7 and the output shaft OS at a ratio of 1.535:1.

The first and second clutches C1 and C2 and the second brake B2 are simultaneously operated at a fifth forward speed stage D5.

In a state that the sixth shaft TM6 is connected to the seventh shaft TM7 by operation of the first clutch C1 and the first shaft TM1 is connected to the fourth shaft TM4 by operation of the second clutch C2, torque of the input shaft IS is input to the first shaft TM1.

In addition, the eighth shaft TM8 is operated as a fixed element by the operation of the second brake B2. Therefore, the torque of the input shaft IS is shifted into the fifth forward speed stage D5, and the fifth forward speed stage D5 is output through the output shaft OS connected to the seventh shaft TM7. That is, the braking of the first rotation element N1 by the brake B2 and the operating of the first and second clutches C1 and C2 results in the torque of the input shaft IS being transferred to the ninth rotation element N9 (third ring gear R3) via third shaft TM3. The first rotation element N1 is braked by the brake B2. Accordingly, the planetary gear set PG3 is driven by torque from the fifth rotation element N5 (i.e., equal to the torque of the input shaft) which drives the ninth rotation element N9. The third rotation element N3 is connected to the tenth rotation element N10 by the second shaft TM2, The seventh rotation element N7 and the twelfth rotation element N12 are connected by the fifth shaft TM5. Accordingly, the planetary gear sets PG1, PG3, PG4 operate in compound and torque is outputted by the eleventh rotation element N11 to the seventh shaft TM7 and the output shaft OS at a ratio of 1.19:1.

The first, second, and third clutches C1, C2, and C3 are simultaneously operated at a sixth forward speed stage D6.

In a state that the sixth shaft TM6 is connected to the seventh shaft TM7 by operation of the first clutch C1, the first shaft TM1 is connected to the fourth shaft TM4 by operation of the second clutch C2, and the second shaft TM2 is connected to the fourth shaft TM4 by operation of the third clutch C3, torque of the input shaft IS is input to the first shaft TM1.

In this case, the first, the third, and the fourth planetary gear sets PG1, PG3, and PG4 become lock-up states. Therefore, the torque of the input shaft IS input to the first shaft TM1 is shifted into the sixth forward speed stage, and the sixth forward speed stage D6 is output through the output shaft OS connected to the seventh shaft TM7. At the sixth forward speed stage D6, rotation speed which is the same as rotation speed of the input shaft IS is output. That is, the operating of the first, second and third clutches C1, C2, C3 results in the torque of the input shaft IS being transferred to the tenth rotation element N10 via the second shaft TM2. Accordingly, the planetary gear set PG3 is driven by torque from fifth rotation element N5 (i.e., equal to the torque of the input shaft IS) which drives the ninth rotation element N9. The seventh rotation element N7 and the twelfth rotation element N12 are connected by fifth shaft TM5. The torque is outputted from the second rotation element N2 to the tenth rotation element N10 (fourth sun gear S4) via the second and third clutches C2 and C3 connecting the first, second and fourth shafts TM1, TM2, TM4. Accordingly, the planetary gear sets PG3 and PG4 operate in compound and torque is outputted by the eleventh rotation element N11 to the seventh shaft TM7 and the output shaft OS at a ratio of 1:1.

The first and third clutches C1 and C3 and the second brake B2 are simultaneously operated at a seventh forward speed stage D7.

In a state that the sixth shaft TM6 is connected to the seventh shaft TM7 by operation of the first clutch C1, and the second shaft TM2 is connected to the fourth shaft TM4 by operation of the third clutch C3, torque of the input shaft IS is input to the first shaft TM1.

In addition, the eighth shaft TM8 is operated as a fixed element by the operation of the second brake B2. Therefore, the torque of the input shaft IS is shifted into the seventh forward speed stage D7, and the seventh forward speed stage D7 is output through the output shaft OS connected to the seventh shaft TM7. That is, the braking of the first rotation element N1 by the brake the B2 and the operating of the first and third clutches C1 and C3 results in the torque from the third rotation element N3 being transferred to the tenth rotation element N10 via the second shaft TM2. The planetary gear set PG2 is driven by torque from the second rotation element N2 which drives the fourth rotation element N4 and torque from the third rotation element N3 which drives the sixth rotation element N6. Also, the fifth rotation element N5 and the ninth rotation element N9 are connected by the third shaft TM3. Accordingly, the planetary gear set PG3 is driven by torque from the fifth rotation element N5 which drives the ninth rotation element N9. The seventh rotation element N7 and the twelfth rotation element N12 are connected by the fifth shaft TMS. Accordingly, the planetary gear sets PG1, PG2, PG3, PG4 operate in compound and torque is outputted by the eleventh rotation element N11 to the seventh shaft TM7 and the output shaft OS at a ratio of 0.811:1.

The first and fourth clutches C1 and C4 and the second brake B2 are simultaneously operated at an eighth forward speed stage D8.

In a state that the sixth shaft TM6 is connected to the seventh shaft TM7 by operation of the first clutch C1, and the second shaft TM2 is connected to the sixth shaft TM6 by operation of the fourth clutch C4, torque of the input shaft IS is input to the first shaft TM1.

In addition, the eighth shaft TM8 is operated as a fixed element by the operation of the second brake B2. Therefore, the torque of the input shaft IS is shifted into the eighth forward speed stage D8, and the eighth forward speed stage D8 is output through the output shaft OS connected to the seventh shaft TM7. That is, the braking of the first rotation element N1 by the brake B2 and the operating of the first and fourth clutches C1 and C4 results in the torque from the third rotation element N3 being transferred to the tenth rotation element N10 and the eleventh rotation element N11. Accordingly, the planetary gear set PG4 is driven by torque from third rotation element N3 which drives tenth rotation element N10 and the eleventh rotation element N11. As such, torque is outputted by the eleventh rotation element N11 to the seventh shaft TM7 and the output shaft OS at a ratio of 0.677:1.

The third and fourth clutches C3 and C4 and the second brake B2 are simultaneously operated at a ninth forward speed stage D9.

In a state that the second shaft TM2 is connected to the fourth shaft TM4 by operation of the third clutch C3, and the second shaft TM2 is connected to the sixth shaft TM6 by operation of the fourth clutch C4, torque of the input shaft IS is input to the first shaft TM1.

In addition, the eighth shaft TM8 is operated as a fixed element by the operation of the second brake B2. Therefore, the torque of the input shaft IS is shifted into the ninth forward speed stage D9, and the ninth forward speed stage D9 is output through the output shaft OS connected to the seventh shaft TM7. That is, the braking of the first rotation element N1 by the brake B2 and the operating of the third and fourth clutches C3 and C4 results in the torque from the third rotation element N3 being transferred to the eight rotation element N8 and the tenth rotation element N10 via the second shaft TM2. The planetary gear set PG2 is driven by torque from the second rotation element N2 which drives the fourth rotation element N4 and torque from the third rotation element N3 which drives the sixth rotation element N6. Also, the fifth rotation element N5 and the ninth rotation element N9 are connected by the third shaft TM3. Accordingly, the planetary gear set PG3 is driven by torque from fifth rotation element N5 which drives the ninth rotation element N9 and torque from the third rotation element N3 which drives the eighth rotation element N8. The seventh rotation element N7 and the twelfth rotation element N12 are connected by fifth shaft TMS. Accordingly, the planetary gear sets PG1, PG2, PG3 PG4 operate in compound and torque is outputted by the eleventh rotation element N11 to the seventh shaft TM7 and the output shaft OS at a ratio of 0.585:1.

The second and fourth clutches C2 and C4 and the second brake B2 are simultaneously operated at a tenth forward speed stage D10.

In a state that the first shaft TM1 is connected to the fourth shaft TM4 by operation of the second clutch C2, and the second shaft TM2 is connected to the sixth shaft TM6 by operation of the fourth clutch C4, torque of the input shaft IS is input to the first shaft TM1.

In addition, the eighth shaft TM8 is operated as a fixed element by the operation of the second brake B2. Therefore, the torque of the input shaft IS is shifted into the tenth forward speed stage D10, and the tenth forward speed stage D10 is output through the output shaft OS connected to the seventh shaft TM7. That is, the braking of the first rotation element N1 by the brake B2 and the operating of the second and fourth clutches C2 and C4 results in the torque from the third rotation element N3 being transferred to the eight rotation element N8 and the tenth rotation element N10 via the second shaft TM2. The planetary gear set PG3 is driven by torque from the second rotation element N2 which drives the ninth rotation element N9 and torque from the third rotation element N3 which drives the eighth rotation element N8. The seventh rotation element N7 and the twelfth rotation element N12 are connected by the fifth shaft TM5. Accordingly, the planetary gear sets PG1, PG3 and PG4 are operated in compound and torque is outputted by the eleventh rotation element N11 to the seventh shaft TM7 and the output shaft OS at a ratio of 0.48:1.

The third clutch C3 and the first and third brakes B1 and B3 are simultaneously operated at a reverse speed stage REV.

In a state that the second shaft TM2 is connected to the fourth shaft TM4 by operation of the third clutch C3, torque of the input shaft IS is input to the first shaft TM1.

In addition, the fifth shaft TM5 and the sixth shaft TM6 are operated as a fixed element by the operation of the first brake B1 and the third brake B3. Therefore, the torque of the input shaft IS is shifted into the reverse speed stage R, and the reverse speed stage R is output through the output shaft OS connected to the seventh shaft TM7 as inverse rotation speed. That is, the operating of the brakes B1, B3 and the clutch C3 results in torque of the input shaft IS being transferred to the fourth rotation element N4 and the fifth rotation element N5 and twelfth rotation element N12 being braked. Accordingly, the sixth rotation element N6 drives the tenth rotation element N10 and torque is outputted from with the eleventh rotation element N11 to the output shaft OS at a ratio of −5.039:1.

Figure 3:
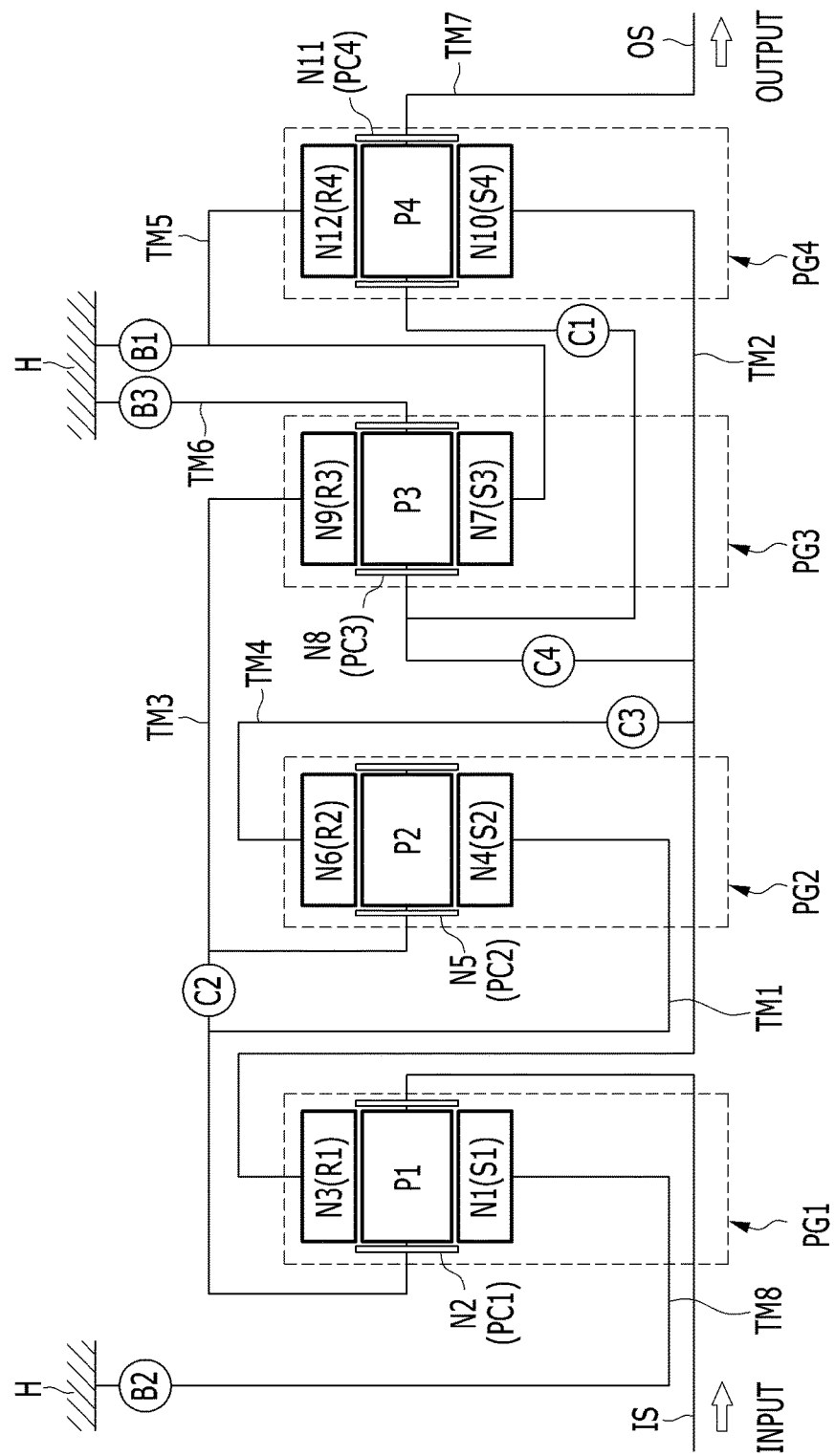
FIG. 3 is a schematic diagram of a planetary gear train according to a second exemplary embodiment of the present disclosure.

FIG. 3 is a schematic diagram of a planetary gear train according to a second exemplary embodiment of the present disclosure.

Referring to FIG. 3, a planetary gear train according to a second exemplary embodiment of the present disclosure includes first, second, third, and four planetary gear sets PG1, PG2, PG3, and PG4, eight shafts TM1 to TM8, and seven control elements C1 to C4 and B1 to B3.

The eight shafts TM1 to TM8 will be described in further detail.

The first shaft TM1 connects the second rotation element N2 (first planet carrier PC1) and the fourth rotation element N4 (second sun gear S2, and is directly connected with the input shaft IS.

The second shaft TM2 connects the third rotation element N3 (first ring gear R3) and the tenth rotation element N10 (fourth sun gear S4).

The third shaft TM3 connects the fifth rotation element N5 (second planet carrier PC2) and the ninth rotation element N9 (third ring gear R3, and is selectively connected with the first shaft TM1.

The fourth shaft TM4 is connected with the sixth rotation element N6 (second ring gear R2), and is selectively connected with the second shaft TM2.

The fifth shaft TM5 is connects the seventh rotation element N7 (third sun gear S3) and the twelfth rotation element N12 (fourth ring gear R4), and is selectively connected with the transmission housing H to be operated as a selective fixed element.

The sixth shaft TM6 is connected with the eighth rotation element N8 (third planet carrier PC3), is selectively connected with the second shaft TM2, and is selectively connected with the transmission housing H to be operated as a selective fixed element.

The seventh shaft TM7 is connected with the eleventh rotation element N11 (fourth planet carrier PC4), is selectively connected with the sixth shaft TM6, and is directly connected with the output shaft OS.

The eighth shaft TM8 is connected with the first rotation element N1 (first sun gear 51, and is selectively connected with the transmission housing H to be operated as a selective fixed element.

In addition, four clutches C1, C2, C3 and C4 are disposed at portions at which any two shafts among the eight shafts TM1 to TM8 including the input shaft IS and the output shaft OS are selectively connected to each other.

In addition, three brakes B1, B2, and B3 are disposed at portions at which any one shaft among the eight shafts TM1 to TM8 is selectively connected to the transmission housing H.

Arrangements of the four clutches C1 to C4 and the three brakes B1 and B3 are described in detail.

The first clutch C1 is disposed between the sixth shaft TM6 and the seventh shaft TM7, and selectively connects the sixth shaft TM6 and the seventh shaft TM7.

The second clutch C2 is disposed between the first shaft TM1 and the third shaft TM3, and selectively connects the first shaft TM1 and the third shaft TM3.

The third clutch C3 is disposed between the second shaft TM2 and the fourth shaft TM4, and selectively connects the second shaft TM2 and the fourth shaft TM4.

The fourth clutch C4 is disposed between the second shaft TM2 and the sixth shaft TM6, and selectively connects the second shaft TM2 and the sixth shaft TM6.

The first brake B1 is disposed between the fifth shaft TM5 and the transmission housing H, and selectively connects the fifth shaft TM5 to the transmission housing H.

The second brake B2 is disposed between the eighth shaft TM8 and the transmission housing H, and selectively connects the eighth shaft TM8 to the transmission housing H.

The third brake B3 is disposed between the sixth shaft TM6 and the transmission housing H, and selectively connects the sixth shaft TM6 to the transmission housing H.

As a result, the planetary gear train according to the second exemplary embodiment merely differs from the planetary gear train according to a first exemplary embodiment only in a location of the second clutch C2 but other elements are the same the planetary gear train according to a first exemplary embodiment.

The shifting operations of the planetary gear train according to the second exemplary embodiment is the same the shifting operations of the planetary gear train according to the first embodiment, as shown in FIG. 2, which is therefore not described in further detail.

The planetary gear trains according to the exemplary embodiment of the present disclosure may achieve at least ten forward speed stages and one reverse speed stage by combining four planetary gear sets PG1, PG2, PG3, and PG4 with the four clutches C1, C2, C3, and C4 and the three brakes B1, B2, and B3.

In addition, a planetary gear train according to an exemplary embodiment of the present disclosure may realize a gear ratio span of more than 10.0, thereby maximizing efficiency of driving an engine.

In addition, the linearity of step ratios of shift stages is secured while multi-staging the shift stage with high efficiency, thereby making it possible to improve drivability such as acceleration before and after a shift, an engine speed rhythmic sense, and the like.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle comprising:
    an input shaft receiving torque of an engine;
    an output shaft outputting torque;
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    a first shaft directly connected to the input shaft and further directly interconnecting the second rotation element and the fourth rotation element;
    a second shaft directly interconnecting the third rotation element and the tenth rotation element;

a third shaft directly interconnecting the fifth rotation element and the ninth rotation element;
a fourth shaft directly connected with the sixth rotation element;
a fifth shaft directly interconnecting the seventh rotation element and the twelfth rotation element;
a sixth shaft directly connected with the eighth rotation element;
a seventh shaft directly connected with the eleventh rotation element and connected with the output shaft; and
an eighth shaft directly connected with the first rotation element.

2. The planetary gear train of claim 1, wherein
the fifth, sixth, and eighth shafts are selectively connected with a transmission housing respectively,
the first shaft is selectively connected with the fourth shaft,
the second shaft is selectively connected with the fourth shaft and the sixth shaft respectively, and
the sixth shaft is selectively connected with the seventh shaft.

3. The planetary gear train of claim 2, further comprising:
a first clutch selectively connecting the sixth shaft and the seventh shaft;
a second clutch selectively connecting the first shaft and the fourth shaft;
a third clutch selectively connecting the second shaft and the fourth shaft;
a fourth clutch selectively connecting the second shaft and the sixth shaft;
a first brake selectively connecting the fifth shaft and the transmission housing;
a second brake selectively connecting the eighth shaft and the transmission housing; and
a third brake selectively connecting the sixth shaft and the transmission housing.

4. The planetary gear train of claim 1, wherein
the fifth, sixth, and eighth shafts are selectively connected with a transmission housing respectively,
the first shaft is selectively connected with the third shaft,
the second shaft is selectively connected with the fourth shaft and the sixth shaft respectively, and
the sixth shaft is selectively connected with the seventh shaft.

5. The planetary gear train of claim 4, further comprising:
a first clutch selectively connecting the sixth shaft and the seventh shaft;
a second clutch selectively connecting the first shaft and the third shaft;
a third clutch selectively connecting the second shaft and the fourth shaft;
a fourth clutch selectively connecting the second shaft and the sixth shaft;
a first brake selectively connecting the fifth shaft and the transmission housing;
a second brake selectively connecting the eighth shaft and the transmission housing; and
a third brake selectively connecting the sixth shaft and the transmission housing.

6. The planetary gear train of claim 1, wherein
the first, second, and third rotation elements of the first planetary gear set are respectively a first sun gear, a first planet carrier, and a first ring gear of the first planetary gear set,
the fourth, fifth, and sixth rotation elements of the second planetary gear set are respectively a second sun gear, a second planet carrier, and a second ring gear of the second planetary gear set,
the seventh, eighth, and ninth rotation elements of the third planetary gear set are respectively a third sun gear, a third planet carrier, and a third ring gear of the third planetary gear set, and
the tenth, eleventh, and twelfth rotation elements of the fourth planetary gear set are respectively a fourth sun gear, a fourth planet carrier, and a fourth ring gear of the fourth planetary gear set.

7. The planetary gear train of claim 1, wherein
the first, second, third, and fourth planetary gear sets are disposed in a sequence of the first, second, third, and fourth planetary gear sets from an engine side.

* * * * *